July 1, 1930.  J. PARCELL  1,769,541
CASING FOR CANDY FLOSS MACHINES
Filed March 2, 1929   2 Sheets-Sheet 1

Inventor
John Parcell
By his Attorney
Aaron L. Applebaum

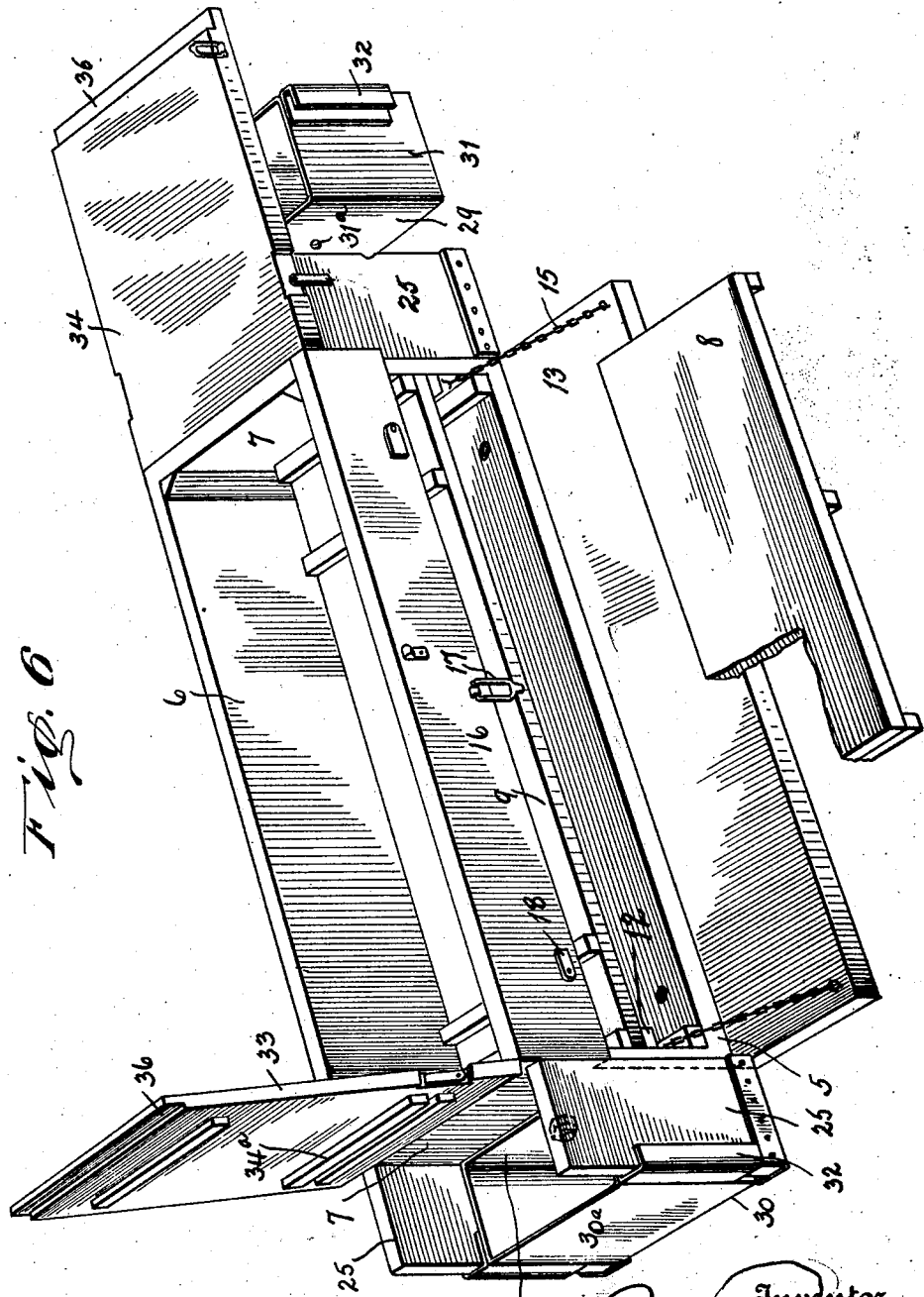

Patented July 1, 1930

1,769,541

UNITED STATES PATENT OFFICE

JOHN PARCELL, OF NEW YORK, N. Y.

CASING FOR CANDY-FLOSS MACHINES

Application filed March 2, 1929. Serial No. 343,950.

This invention relates to improvements in casings for candy floss machines of the dual or triplicate type and has for its object to provide a compact shipping container which may be quickly converted into a portable folding cabinet.

One of the objects of my invention is to provide a casing or cabinet for receiving the parts and elements of a dual or triplicate candy floss machine which may be operated without removing the machine from the casing including provision for employing the covers for displaying the manufactured candy floss.

A further object of my invention is to provide a portable, compact cabinet or housing for a dual or triplicate candy floss machine in which the machines proper may be operated without removing the same, said cabinet having hinged top and end doors and an interior compartment for storing equipment and auxiliaries associated with the machines, all constructed and arranged for convenience both in transportation and assembly of the machines for commercial purposes.

Figure 1:
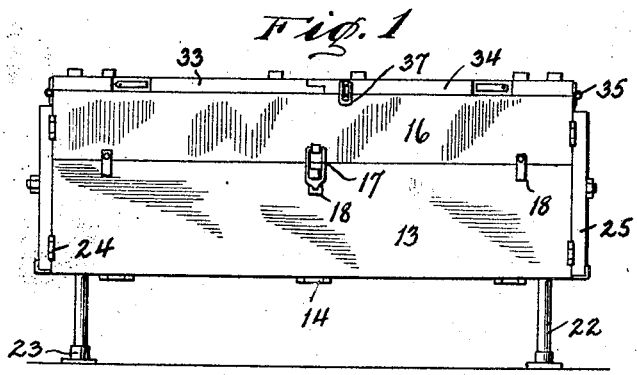
Figure 2:
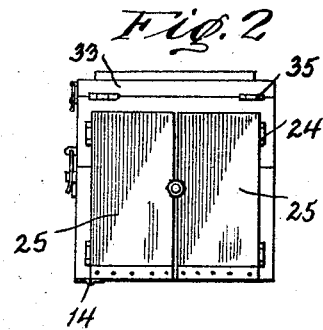
Figure 3:
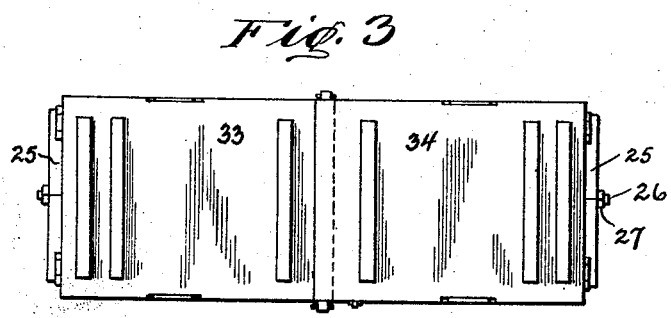
Figure 5:
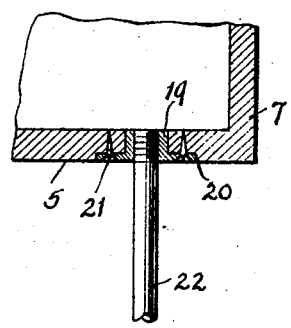
Figure 4:
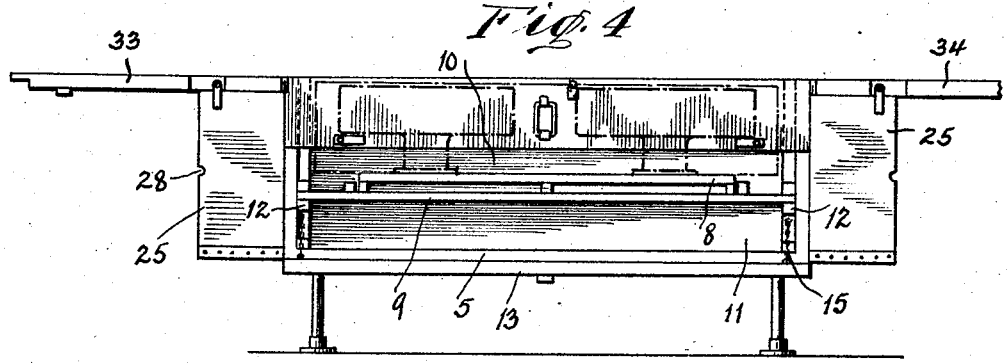

To enable others skilled in the art to more fully comprehend the underlying features of my invention, reference is had to the accompanying drawing forming a part of this specification in which Fig. 1 is a front view.
Fig. 2 is an end view.
Fig. 3 is a top view.
Fig. 4 is an open front view.
Fig. 5 is a sectional view showing a detachable supporting member.
Fig. 6 is a perspective view showing the cabinet when completely open.

Referring now to the drawings, 5 designates the bottom, 6 the rear wall and 7 the ends of a substantially rectangular casing, cabinet or housing for a dual or triplicate candy floss machine which is preferably set on a removable machine board 8 as shown by Fig. 4 of the drawing. The candy floss machines and the machine board 8 are positioned in the casing through the top thereof, being seated on a partition 9 which divides the casing into a machine compartment 10 and a bottom or storage compartment 11 adapted to receive various articles such as paper cones, sugar, machine tools or other auxiliary and necessary articles for the machine proper or the candy floss to be made.

The partition 9 is supported on end reenforcing strips 12 and the said storage compartment is equipped with a front door 13 hingedly connected as at 14 to the bottom and supported by loose suspension chains 15 attached to the inner ends of the casing. It will be noted that the front wall 16 and door 13 when closed completely encases the front of the machine, a hasp 17 and hook 18 locking the door to the front wall, said door adapted to be also held in a temporary closed position by pivoted link straps 18.

The bottom 5 of the casing is provided with countersunk internally threaded bushings 19 each having a flange 20 and fastened by screws 21, said bushings receiving the threaded supporting rod 22 having a bottom flanged fitting 23 and constituting the supporting legs of the machine. When the machine is being transported or shipped, the detachable legs may be stored in the compartment 11 with the other accessories of the machine.

Hingedly connected at 24 to the ends 7 of the casing, I provide a pair of extension walls 25 which may swing outwardly in alignment with the front and rear walls of the casing. When shipping the casing, the doors are held in a locked position by a screw bolt and nut 26, 27, said bolt passing through opposed notches 28. The bolts 26 are also adapted to partially support and lock the rear wall 29 of an end receptacle or container 30, said rear wall having an opening 31ᵃ for passage of the shank of the bolt.

The receptacle 30 comprises a substantially rectangular body having a front wall 30ᵃ and sides 31 flush with the end doors when opened. Attached to the sides 31 are U-shaped members 32 which fit over the edges of the doors as clearly shown by Fig. 6 of the drawing.

The casing is also provided with a pair of covers 33, 34 having reenforcing strips 34ᵃ and are hinged as at 35 to the ends, the inner edges of said covers being undercut as at 36 for engagement with each other, the cover 34 having a lock 37 for maintaining the said covers closed. The covers 34, 35 may be opened to a horizontal position thus affording end counter surfaces on which the merchandise may be displayed. From the above construction it will be seen that the spaced machines shown in dotted lines for instance in Fig. 4 and the casing may be shipped as a unit and by opening the top covers and end doors, the merchant may set up the legs or supports and utilize the casing for transacting business. The parts are constructed and arranged to minimize space yet affording all conveniences necessary for packing, shipping and making the candy floss. It is of course understood that the machines must be located in proximity to a source of electric current supply but since the construction of the candy floss machines is no part of my invention, a description thereof is not necessary.

While I have shown and described my invention with some degree of particularity, it will be realized that other modifications and changes may be restored to under special conditions. I therefore do not wish to be limited and restricted to the exact details shown and described but reserve the right to make such changes and modifications as may fairly fall within the scope of the subject matter now being claimed.

Having shown and described my invention what I claim as new and desire to secure by Letters Patent is:—

1. A candy floss machine casing comprising a front wall, a rear wall, bottom and ends, a horizontal partition between the ends, a removable board on which a plurality of objects are adapted to be mounted, a door hinged to the bottom for closing the compartment below said board, extension walls for said casing adapted to be opened in alignment with the front and rear wall of the casing, and hinged covers connected to the top of said casing forming a merchandise display surface, when opened.

2. A candy floss machine casing comprising a front wall, rear wall, bottom and ends, a horizontal partition, a removable machine board supported on said partition, a hinged door for the compartment below the partition, vertically pivoted extension walls connected to the ends of said casing adapted to be opened in alignment with the front and rear wall, receptacles supported by the end walls between the open extension walls, a pair of hinged top covers and detachable supports connected to the bottom of the casing.

In testimony whereof I affix my signature.

JOHN PARCELL.